(12) United States Patent
Tanahashi et al.

(10) Patent No.: US 10,501,034 B2
(45) Date of Patent: Dec. 10, 2019

(54) VEHICLE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 191 days.

(21) Appl. No.: 14/976,262

(22) Filed: Dec. 21, 2015

(65) Prior Publication Data
US 2016/0185310 A1 Jun. 30, 2016

(30) Foreign Application Priority Data
Dec. 26, 2014 (JP) .................. 2014-264323

(51) Int. Cl.
| | |
|---|---|
| *B60C 19/08* | (2006.01) |
| *H05F 3/00* | (2006.01) |
| *B60R 16/06* | (2006.01) |
| *B62D 35/00* | (2006.01) |
| *B60J 1/08* | (2006.01) |
| *B60J 1/20* | (2006.01) |
| *B60J 5/04* | (2006.01) |
| *H01T 19/04* | (2006.01) |
| *B60J 10/72* | (2016.01) |
| *B60R 13/02* | (2006.01) |

(52) U.S. Cl.
CPC ................. *B60R 16/06* (2013.01); *B60J 1/08* (2013.01); *B60J 1/20* (2013.01); *B60J 1/2002* (2013.01); *B60J 5/0493* (2013.01); *B60J 10/72* (2016.02); *B60R 13/0212* (2013.01); *B62D 35/00* (2013.01); *H01T 19/04* (2013.01)

(58) Field of Classification Search
CPC .... B60R 16/06; B60R 13/0212; B60J 1/2002; B60J 10/72
USPC ......................................... 361/217
See application file for complete search history.

(56) References Cited

U.S. PATENT DOCUMENTS

| | | | |
|---|---|---|---|
| 5,247,420 A | 9/1993 | Bakhoum | |
| 7,151,988 B2 | 12/2006 | Sasaki et al. | |
| 2008/0037937 A1* | 2/2008 | Schempp ............. | G02B 6/4277 385/77 |

(Continued)

FOREIGN PATENT DOCUMENTS

| | | |
|---|---|---|
| CN | 202004736 U | 10/2011 |
| CN | 103802758 A | 5/2014 |

(Continued)

*Primary Examiner* — Thienvu V Tran
*Assistant Examiner* — Lucy M Thomas
(74) *Attorney, Agent, or Firm* — Hunton Andrews Kurth LLP

(57) ABSTRACT

A vehicle is provided in which separation of positively charged airflow from a positively charged surface of a vehicle body can be prevented. A vehicle body is insulated from a road surface, and positive static charges accumulate on the vehicle body during propulsion. The vehicle comprises a self-discharge device adapted to decrease a positive potential of a window pane at which positively charged airflow flowing along a vehicle surface deviates therefrom during propulsion by discharging the static electricity through the airflow to produce negative ions according to the positive potential of the window pane.

1 Claim, 9 Drawing Sheets

(56) References Cited

U.S. PATENT DOCUMENTS

| | | |
|---|---|---|
| 2009/0159391 A1 | 6/2009 | Eisengruber |
| 2010/0253114 A1* | 10/2010 | Ohmiya .............. B60R 13/0225 |
| | | 296/187.05 |
| 2011/0170810 A1* | 7/2011 | Oki ........................... C08J 5/18 |
| | | 384/26 |

FOREIGN PATENT DOCUMENTS

| | | |
|---|---|---|
| DE | 10 2008 0011 03 A1 | 10/2009 |
| EP | 3064416 A1 | 9/2016 |
| JP | H10-083891 A | 3/1998 |
| JP | 2002-104106 A | 4/2002 |
| JP | 2006-088880 A | 4/2006 |
| JP | 2008 143476 A | 6/2008 |
| JP | 2011-508167 | 3/2011 |
| JP | 2012210945 A | 11/2012 |
| WO | 2009085569 A1 | 7/2009 |
| WO | 2015/064195 A1 | 5/2015 |

* cited by examiner

VEHICLE

The present invention claims the benefit of Japanese Patent Application No. 2014-264323 filed on Dec. 26, 2014 with the Japanese Patent Office, the disclosures of which are incorporated herein by reference in its entirety.

BACKGROUND

Field of the Invention

Embodiments of the present invention relates to the art of an automobile.

Discussion of the Related Art

JP-A-2006-88880 describes a vehicle in which a silicon rubber sheet having an uneven surface is attached to a surface of a vehicle body to prevent airflow separation from the surface of the vehicle body.

JP-A-2002-104106 describes an industrial vehicle in which a conductive non-woven fabric that causes corona discharge is attached to an outer surface of the vehicle. According to the teachings of JP-A-2002-104106, ions of opposite polarity to that of ionized air resulting from corona discharge around a vehicle body are attracted to the vehicle body thereby neutralizing charge on the vehicle body.

However, the silicon rubber sheet having an uneven surface taught by JP-A-2006-88880 may cause disfigurement of a vehicle if attached to a vehicle surface. In addition, the silicon rubber sheet may be electrostatically charged easily during propulsion of the vehicle. Consequently, air may be separated from the sheet attached to the vehicle surface by repulsive force acting between the ionized air and static electricity on the sheet.

The conductive non-woven fabric taught by JP-A-2002-104106 may also cause disfigurement of a vehicle if attached to a vehicle surface. In addition, if the non-woven fabric is attached entirely to the vehicle surface, air may not be separated from a desired site of the vehicle body and hence desired aerodynamic characteristics of the vehicle may not be achieved. Consequently, driving performance of the vehicle may be degraded.

SUMMARY

Aspects of embodiments of the present invention have been conceived noting the foregoing technical problems, and it is therefore an object of embodiments of the present invention is to provide a vehicle which can prevent separation of positively charged airflow from a positively charged surface of a vehicle body during propulsion.

During propulsion of the vehicle, positive static charges accumulate on a vehicle body insulated from a road surface. In order to achieve the above-explained objective, the vehicle according to embodiments of the present invention is provided with a self-discharge device that is adapted to decrease positive potential of a window pane at which positively charged airflow flowing along a vehicle surface deviates therefrom during propulsion by discharging the static electricity in the airflow to produce negative ions according to the positive potential of the window pane.

According to a first aspect of an embodiment of the present invention, the vehicle is provided with a door frame having the window pane. In this case, the self-discharge device may be attached to an inner face of the window pane.

According to a second aspect of an embodiment of the present invention, the window pane is formed in the vehicle body. In this case, the self-discharge device may be attached to an outer surface of the window pane.

According to a third aspect of an embodiment of the present invention, the vehicle is provided with a door frame having a window pane that is fitted into the vehicle body. In this case, the self-discharge device may be attached to a site that is opposed to an inner surface of the window pane when the door frame is closed.

According to a fourth aspect of an embodiment of the present invention, the vehicle is provided with a roof panel connected to a window pane, and an interior material attached to an inner surface of the roof panel. In this case, the self-discharge device is attached to an edge of the interior material. For example, the interior material may be made of resin.

According to the fourth aspect of an embodiment of the present invention, the self-discharge device may also be attached to an inner surface of the roof panel outside of the interior material.

Thus, according to embodiments of the present invention, the vehicle is provided with the self-discharge device that is adapted to decrease positive potential of the window pane at which positively charged airflow flowing along the vehicle surface deviates therefrom during propulsion by discharging the static electricity in the airflow to produce negative ions according to the positive potential of the window pane. According to embodiments of the present invention, therefore, the static electricity accumulating on the vehicle surface can be eliminated to decrease the positive potential so that a repulsive force acting between the positively charged airflow and the positively charged vehicle surface can be damped. That is, separation of the airflow from the vehicle surface can be prevented during propulsion of the vehicle. For this reason, deterioration in aerodynamic characteristics of the vehicle can be avoided to improve a traveling stability of the vehicle.

Basically, the window pane is situated at a relatively high level in the vehicle to a ensure passenger's view, and the self-discharge device is arranged in such a manner to prevent separation of the airflow especially at a high level in the vehicle. According to embodiments of the present invention, therefore, deterioration in the aerodynamic characteristics of the vehicle can be prevented especially effectively in the rolling direction and the pitching direction.

In addition, the self-discharge device may be arranged at a blind spot from outside the vehicle. According to embodiments of the present invention, therefore, the static electricity accumulating on the vehicle surface can be eliminated without causing disfigurement of the vehicle.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENTS

Figure 8:
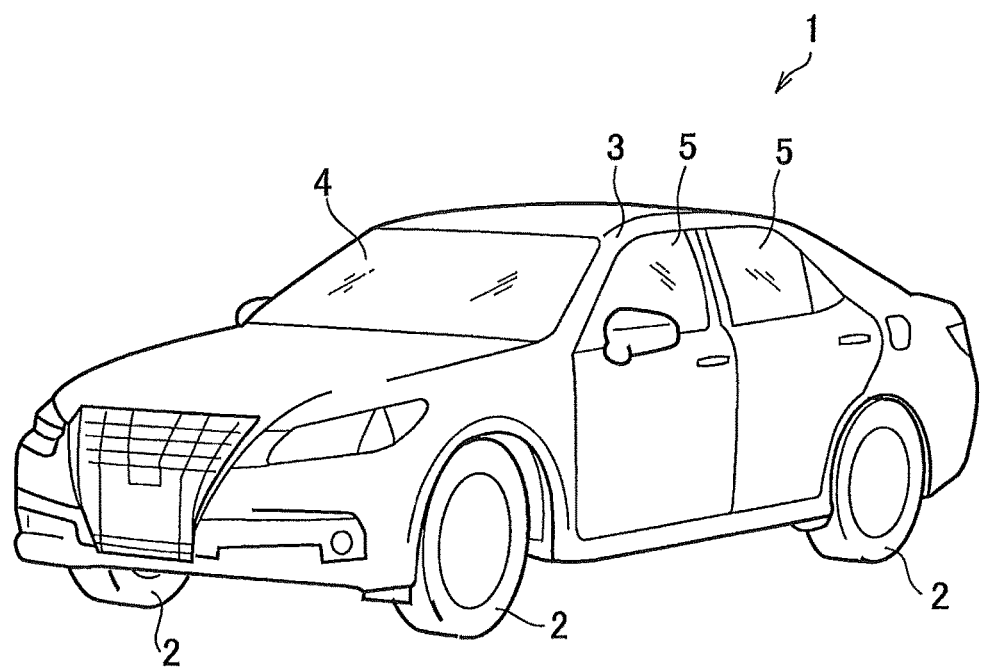
FIG. 8 is a perspective view showing one example of a vehicle to which an embodiment of the present invention is applied.

Referring now to FIG. 8, there is shown one example of a vehicle to which an embodiment of the present invention is applied. In the vehicle 1, a tire made of insulating material whose electrical conductivity is small, such as rubber, is individually mounted on each wheel 2 to insulate a vehicle body 3 from a road surface. During propulsion of the vehicle 1, positive static charges may accumulate on a body 3 for a variety of reasons, e.g., friction between a surface of the body 3 and external airstream or friction between an air duct and air flowing therethrough. The positive static charges may also accumulate on the body 3 due to friction between slidable members of a prime mover such as an engine and a motor, a transmission, a suspension etc. The positive static charges may also accumulate on the body 3 due to friction between the tire and the road surface, and an electrical spark resulting from detachment of the tire from the road surface. In addition, the positive static charges may also accumulate on the body 3 due to electrical activity of electrical equipment and an influence of external electrical cables etc.

Static electricity may also accumulate on other parts of the body and panels made of material of relatively high electrical conductivity due to electrical resistance at a joint portion.

Figure 9:
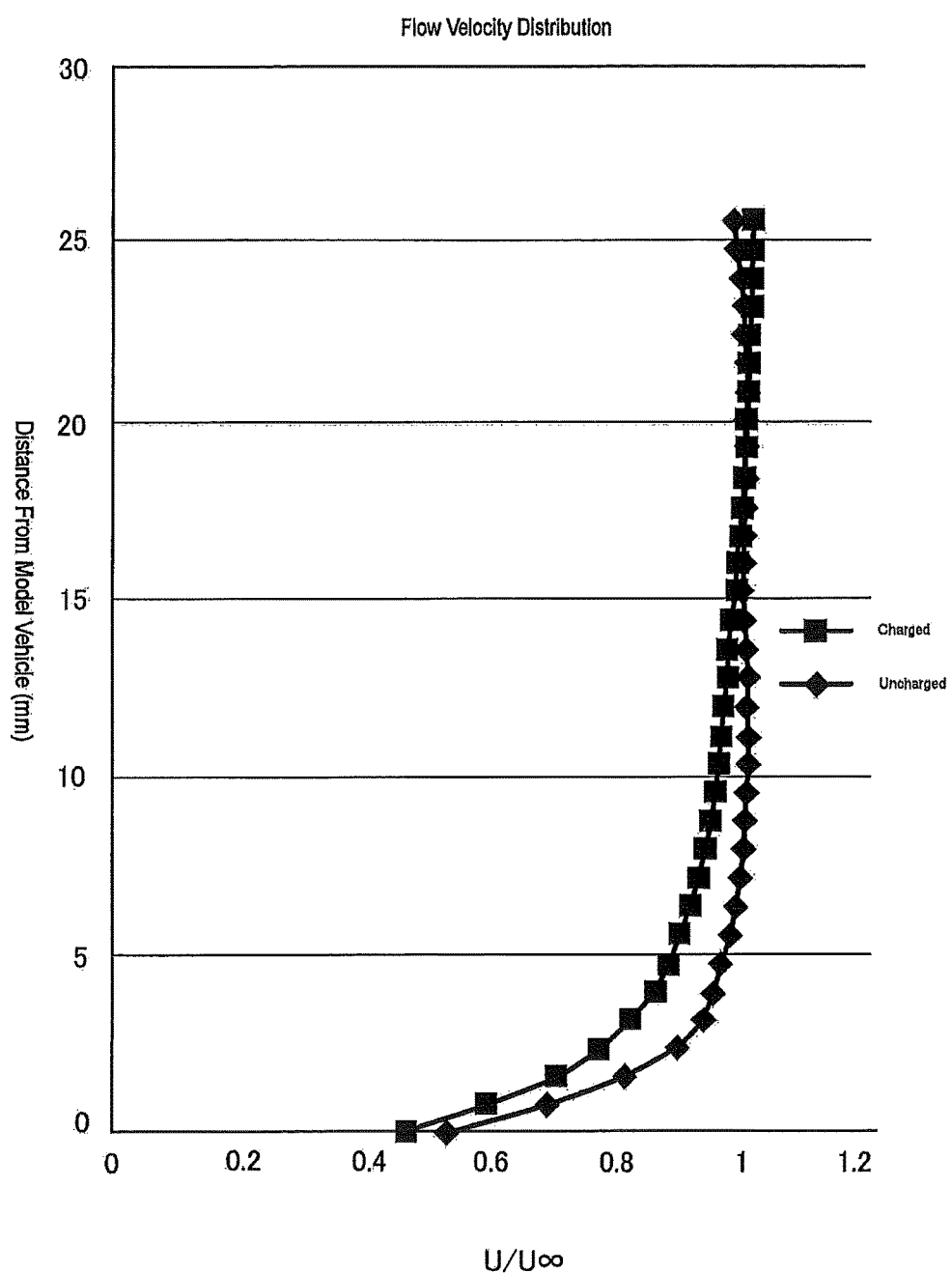
FIG. 9 is a graph indicating measurement results of flow velocity distributions in a direction perpendicular to a surface of a model vehicle.

Basically, air is charged positively and hence repulsive force acts between the air and the body 3 on which the positive charges accumulate. Turning to FIG. 9, there are shown measurement results of flow velocity distribution in a direction perpendicular to a positively charged surface of a model vehicle, and flow velocity distribution in a direction perpendicular to an uncharged surface of a model vehicle. In FIG. 9, the vertical axis represents a distance from the surface of the model vehicle, and the horizontal axis represents a ratio of a flow velocity U of the air flowing on the surface of the model vehicle to a flow velocity U∞ measured from a predetermined distance (U/Uµ). Square dots represent measured values of flow velocity of the air flowing on the positively charged surface of the model vehicle, and rhombus dots represent measured values of flow velocity of the air flowing on the uncharged surface of the model vehicle.

As can be seen from FIG. 9, a thickness of a boundary layer (i.e., a distance from the vehicle surface at which the ratio U/U∞ is substantially zero) of the case in which the surface of the model vehicle is positively charged is thicker than that of the case in which the surface of the model vehicle is not charged. This means that the airflow is isolated further away from the positively charged surface of the model vehicle in comparison with the case in which the surface is not charged. This is because the airflow is basically charged positively and hence the positively charged airflow and the positively charged surface of the vehicle repel each other.

During propulsion of the vehicle 1, the airflow flowing along the surface of the body 3 has a tendency to deviate from the surface of the body 3 at specific points. Specifically, the airflow deviates from the surface of the body 3 at a portion where the body 3 is bent inwardly. For example, the airflow has a tendency to deviate from the surface of the body 3 at a pane of the windshield 4 and at a pane of a rear window depressed inwardly from a flowing direction of the airflow, and also deviate from the surface of the vehicle 3 at a pane of a side window 5 protruded outwardly from the flowing direction of the airflow.

Given that the positive electrostatic charges accumulate on the above-mentioned points, the positively charged airflow is repelled therefrom. In order to avoid such separation of the airflow, according to the preferred example, the positive potential of the window pane is decreased by attaching a self-discharge device, adapted to produce negative ions according to the positive potential, to the body 3. Specifically, the self-discharge device is a sheet made of material having high electric conductivity such as gold, silver, copper aluminum etc., and adapted to cause corona discharge according to the potential thereof. As well known in the art, corona discharge is caused at a sharp point of a charged object. Therefore, the sheet is preferably formed into a multangular shape having a knurled edge on its outer circumference. Optionally, it is further preferable to knurl an outer surface of the sheet.

The self-discharge device may also be formed of coating or plating material having high electric conductivity to be applied to the window pane. Instead, the self-discharge device may also be made of conductive polymer or plastic such as polyaniline, polypyrrole, polythiophene.

Figure 1:
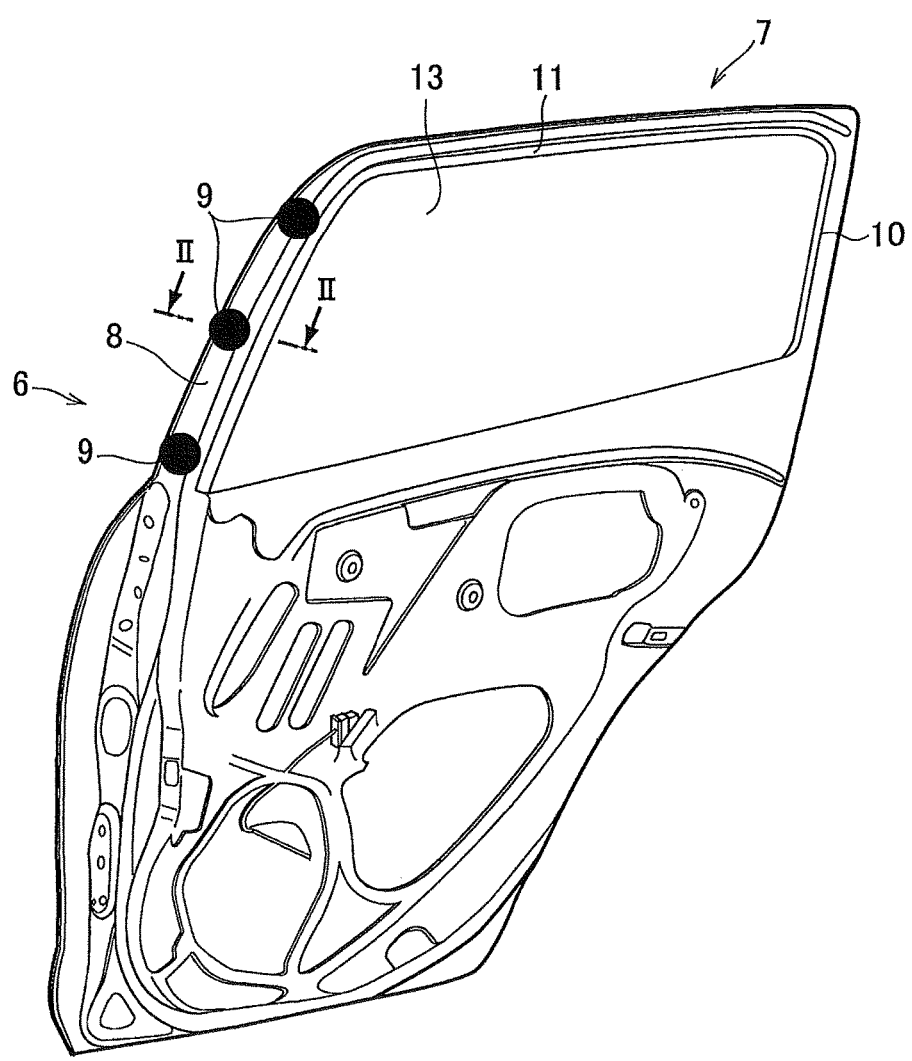
FIG. 1 is an explanatory illustration showing a discharging sheets attached to an edge of a rear side door.

Turning now to FIG. 1, there is shown a first example of the vehicle in which the self-discharge devices are attached to a rear side door 6 of the vehicle 1. As depicted in FIG. 1, a pane 7 is arranged in an upper area of the rear side door 6 to ensure a passenger's view. According to the first example, a plurality of discharging sheets 9 individually serving as a self-discharge device is attached to a side frame 8 of hinge side of the pane 7 extending in a height direction of the vehicle 1. Specifically, each discharging sheet 9 is individually cut into rectangular shape from aluminum sheet material, and three discharging sheets 9 are attached to the side frame 8 at predetermined intervals. In order to equalize aerodynamic characteristics on both sides of the vehicle 1, it is preferable to attach the same number of the discharging sheets 9 to the side frame 8 of both rear side doors 6. Optionally, the discharging sheets 9 may also be attached to the other side frame 10 on the door handle side and a horizontal frame 11.

Figure 2:
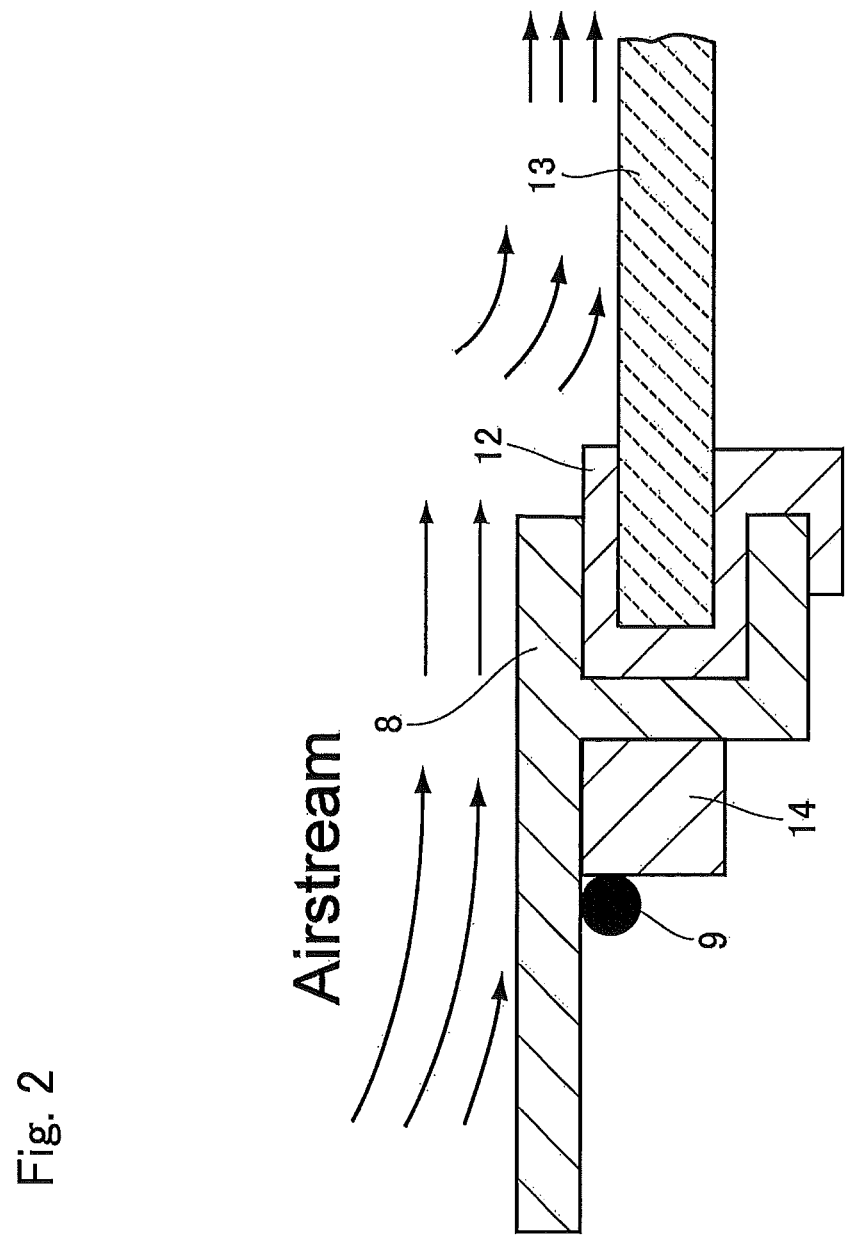
FIG. 2 is a cross-sectional view showing a cross-section along II-II line in FIG. 1.

Turning to FIG. 2, there is shown a cross-section of the side frame 8 along II-II line in FIG. 1. As illustrated in FIG. 2, the side frame 8 of the pane 7 has a groove opening inwardly of the pane 7, and a first sealing rubber 12 is fitted into the groove of the side frame 8 to prevent intrusion of water into a vehicle compartment and to maintain airtightness of the vehicle compartment. The first sealing rubber 12 also has a groove opening inwardly and an edge of a window glass 13 is fitted into the groove of the sealing rubber 12. The window glass 13 can be raised and lowered by a motor (not shown).

The rear side door 6 is hinged at the front facing edge (i.e., left side in FIG. 1) to be opened outwardly, and an outer circumferential edge of the rear side door 6 is covered by a second sealing rubber 14 that is to be interposed between the outer circumferential edge of the rear side door 6 and the vehicle body when the rear side door 6 is closed. In the side frame 8, the second sealing rubber 14 is situated on the other side of the groove to which the first sealing rubber 12 is inserted. According to the first example, each discharging sheet 9 is individually attached to an inner face of the side frame 8 at a point adjacent to a front face of the second sealing rubber 14. That is, the discharging sheets 9 are situated outside of the second sealing rubber 14 so that outer surfaces of the discharging sheets 9 are exposed to external air.

Positive static electricity on the pane 7 is discharged through the discharging sheets 9 attached to the pane 7. That is, accumulation of static electricity on the pane 7 is neutralized by the discharging sheets 9 attached to the pane 7. During propulsion of the vehicle 1, air flows tangentially to the outer surfaces of the pane 7 and the window glass 13 by the Coanda effect. However, given that the pane 7 is charged positively, the external airflow that is basically charged positively will be repelled from the outer surface of the pane 7. An increase in positive charges on the vehicle body 3 that causes repulsion of the airflow away from the pane 7 will result in corona discharge from the discharging sheets 9. Consequently, the positive potential on the discharging sheets 9 and in the vicinity thereof are decreased, and the positive potentials on the window glass 13 is also decreased through the sealing rubbers 12 and 14. As a result of such reduction in the positive potential on the discharging sheets 9 and the portions around them, the repulsive force acting between the airflow and the pane 7 is damped. In addition, negative ions around the discharging sheets 9 are increased as a result of increasing the positive charges on the discharging sheets 9, and the negative ions thus produced are attracted to the positively charged discharging sheets 9 and in the vicinity thereof. Consequently, the airflow containing negative ions is attracted to the pane 7 to which the discharging sheets 9 are attached and the outer surface of the window glass 13. Thus, according to the preferred example, separation of the external airflow of the vehicle from the outer surfaces of the pane 7 and the glass window 13 can be avoided. Specifically, the positive potential can be effectively reduced within an area approximately from 150 mm to 200 mm around the discharging sheet 9.

As described, a surface of the discharging sheet 9 has to be exposed to the air to discharge the static electricity from the discharging sheet 9. To this end, according to the first example, the discharging sheets 9 are attached to the side frame 8 of the pane 7 outside of the second sealing rubber 14 so that the discharging sheets 9 can be exposed to the air without causing disfigurement of the vehicle 1. In the rear side door 6, therefore, accumulation of static electricity on the pane 7, the window glass 13, and the sealing rubbers 12 and 14 within the above-mentioned area around the discharging sheet 9 can be discharged through the discharging sheet 9. For this reason, separation of the external airflow from the pane 7 and in the vicinity thereof can be prevented during propulsion of the vehicle 1.

As a result of thus preventing the separation of the external airflow from lateral sides of the vehicle 1, deterioration in aerodynamic characteristics of the vehicle 1 in the rolling direction and the yawing direction can be prevented. Since the pane 7 is situated at a relatively high level in the vehicle 1, deterioration in aerodynamic characteristics can be prevented especially effectively in the rolling direction to improve a turning performance and a traveling stability of the vehicle 1. For example, even when the vehicle 1 making a turn receives air diagonally, a difference between down-forces in the inner wheel side and the outer wheel side can be reduced to improve a turning performance of the vehicle 1.

Figure 3:
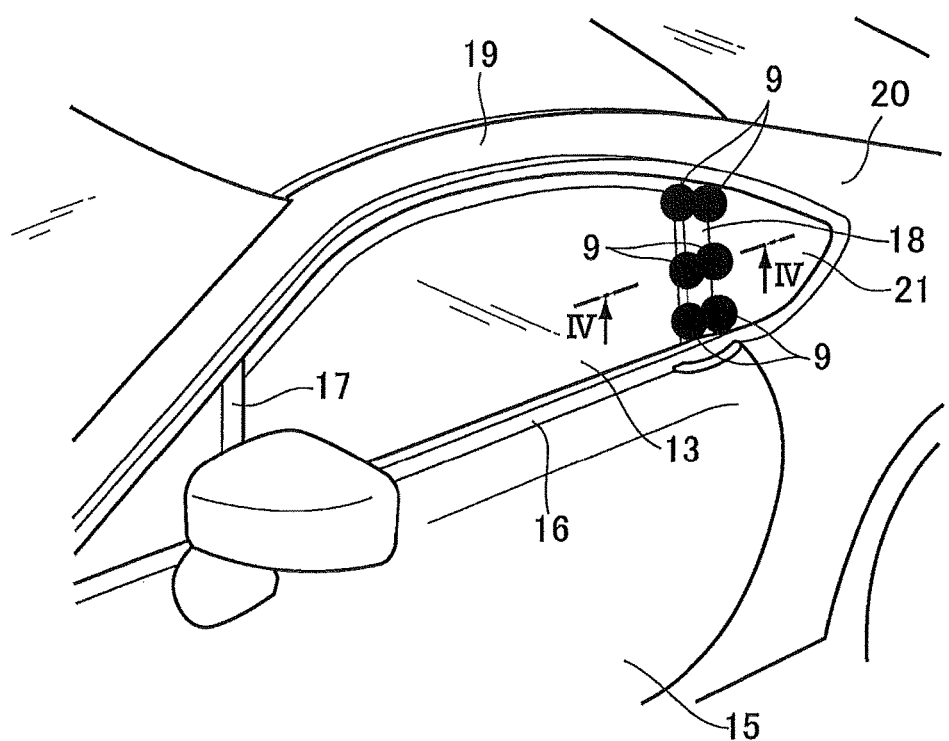
FIG. 3 is an explanatory illustration showing the discharging sheets attached to a window pane in a two-door vehicle.

Referring now to FIG. 3, there is shown a second example of the vehicle to which the discharging sheet 9 is attached. In a two-door coupe, a frame of the window glass 13 is formed by an upper edge 16 of a side door 15, a vertical frame 17 extending upwardly from a hinge side of the upper edge 16, a center pillar (i.e., a B pillar) 18 extending substantially vertically along a rear edge of the side door 15, and a roof side panel 19 extending along a lateral side of a roof. In the vehicle shown in FIG. 3, the side door 15 is a conventional door hinged in the front side of the vehicle, and the window glass 13 is raised from the upper edge 16 between the vertical frame 17 and the center pillar 18 to the roof side panel 19. In addition, a fixed glass 21 is enclosed in a frame formed by the center pillar 18 and a rear end corner 20 of the roof side panel 19.

Figure 4:
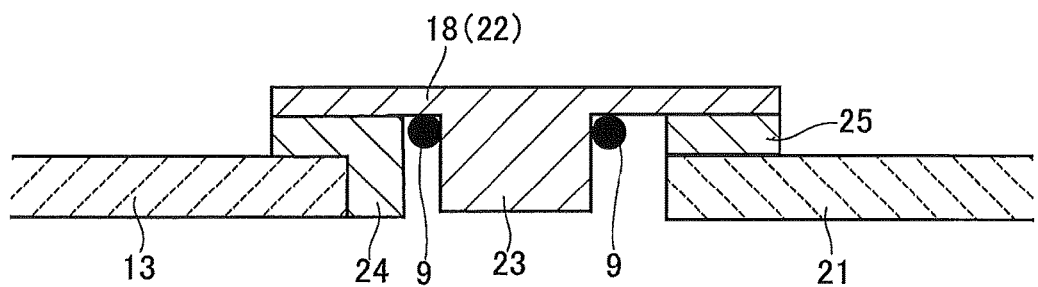
FIG. 4 is a cross-sectional view showing a cross-section along II-II line in FIG. 3.

Turning to FIG. 4, there is shown a cross-section of the center pillar 18 along IV-IV line in FIG. 3. As illustrated in FIG. 4, the center pillar 18 is comprised of a wall 22 covering a clearance between a rear edge of the window glass 13 and a front edge of the fixed glass 21 from inside, and a rib 23 protruding outwardly from between the window glass 13 and the fixed glass 21. In order to prevent intrusion of water into the vehicle compartment and to maintain airtightness of the vehicle compartment, according to the second example, a first sealing rubber 24 is attached to a front end of an outer surface of the wall 22 while keeping a clearance from a front side face of the rib 23, and a second sealing rubber 25 is attached to a rear end of the outer surface of the wall 22 while keeping a clearance from a rear side face of the rib 23. According to the second example, three discharging sheets 9 are attached to the outer face of the wall 22 on each side of the rib 23 between the front side face of the rib 23 and the first sealing rubber 24, and between the rear side face of the rib 23 and the second sealing rubber 25. As illustrated in FIG. 9, those discharging sheets are attached to the outer surface of the wall 22 while keeping predetermined intervals in height direction of the vehicle.

When the side door 15 is closed, the window glass 13 is connected to the discharging sheets 9 through the first sealing rubber 24 and the center pillar 18. According to the second example, the surface of each discharging sheet 9 is individually exposed to the external air so that the positive charges on the discharging sheets 9 and in the vicinity thereof may also be decreased by discharging the static electricity through the discharging sheets 9 as in the vehicle 1 shown in FIG. 1.

Figure 5:
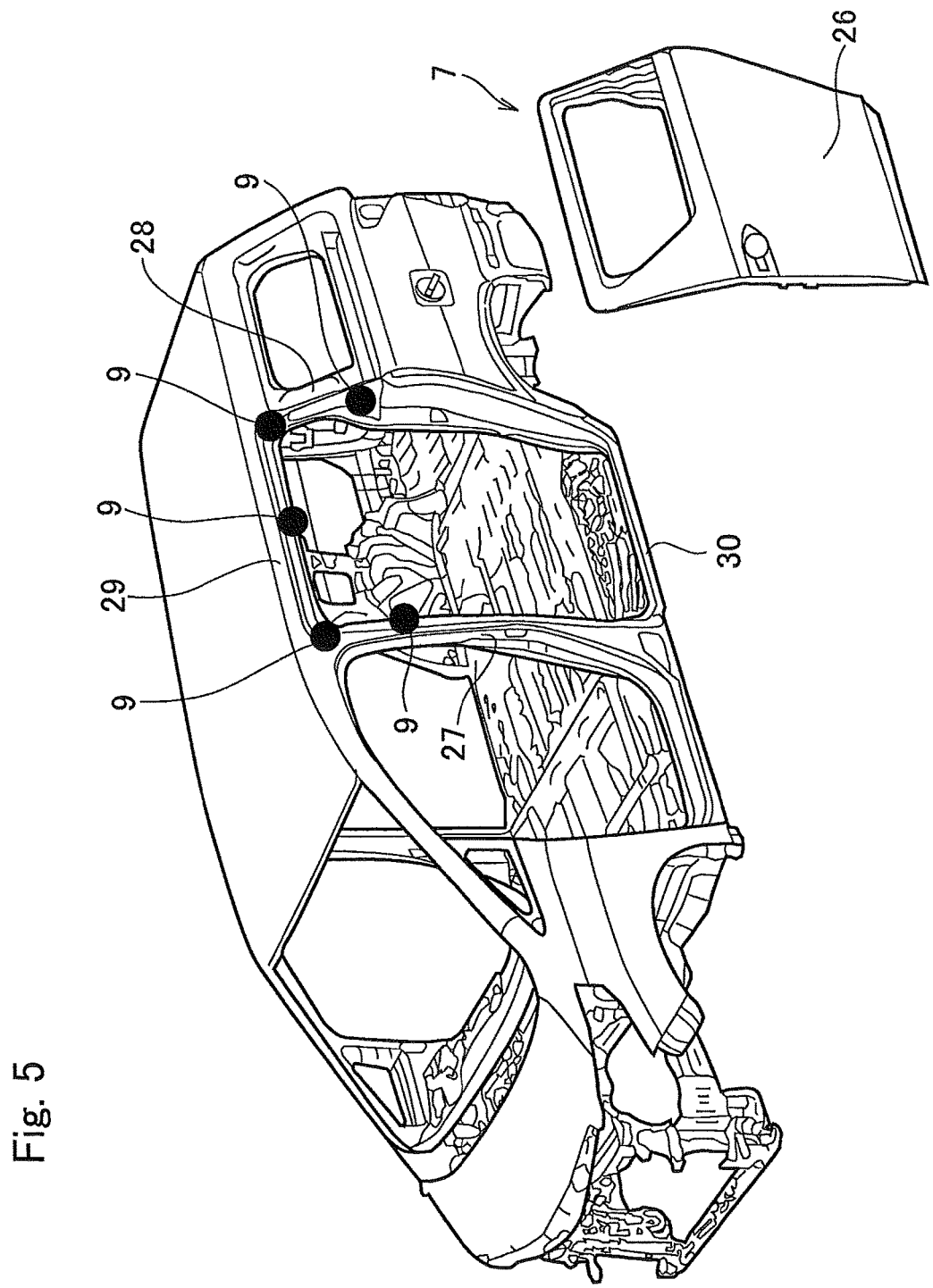
FIG. 5 is a an explanatory illustration showing the discharging sheets attached to a frame of a sliding door of a mini-van around a window pane.

Turning now to FIG. 5, there is shown a third example of the vehicle such as a mini-van. The vehicle shown in FIG. 5 is provided with a rear sliding door 26 having the pane 7. The rear sliding door 26 is fitted into a frame formed of a center pillar (i.e., a B pillar) 27, a rear pillar (i.e., a C pillar) 28, a roof side panel 29, and a rocker panel 30. In order to prevent intrusion of water into the vehicle compartment when the rear sliding door 26 is closed, a weather strip to which an inner edge of the rear sliding door 26 is contacted is attached to inner edges of the center pillar 27, the rear pillar 28, the roof side panel 29, and the rocker panel 30.

According to the third example, the discharging sheets 9 are attached to sites to be opposed to the inner edge of the pane 7 when the rear sliding door 26 is closed. Specifically, the discharging sheets 9 are attached to an upper portion of the center pillar 27, a corner between the center pillar 27 and the roof side panel 29, an intermediate portion of the roof side panel 29, a corner between the roof side panel 29 and the rear pillar 28, and an upper portion of the rear pillar 28. In addition, those discharging sheets 9 are situated outside of the weather strip to be exposed to the external air so that the static electricity can be discharged from the discharging sheets 9.

Thus, according to the third example, the discharging sheets 9 are not attached to the pane 7. However, a connection between the discharging sheets 9 and the pane 7 is provided by closing the rear sliding door 26 so that the positive charges on the pane 7 can be reduced as in the vehicle 1 shown in FIG. 1.

Figure 6:
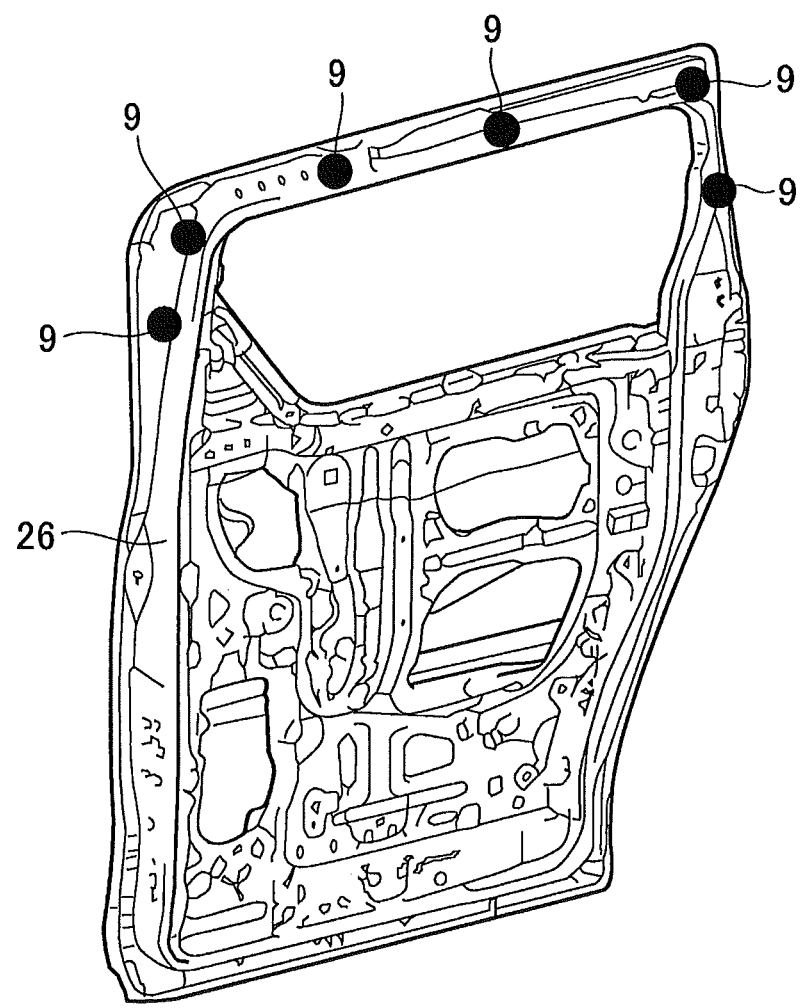
FIG. 6 is a an explanatory illustration showing the discharging sheets attached to the window pane of the sliding door.

Alternatively, according to the third example, the discharging sheets 9 may also be attached to the inner edge of the rear sliding door 26. Referring now to FIG. 6, there is shown an inner face of the rear sliding door 26 to which the discharging sheets 9 are attached to the inner edge of the pane 7. In this case, it is preferable to attach the discharging sheets 9 to the inner edge of the rear sliding door 26 at sites not to be covered by the weather strip when closing the rear sliding door 26.

Figure 7:
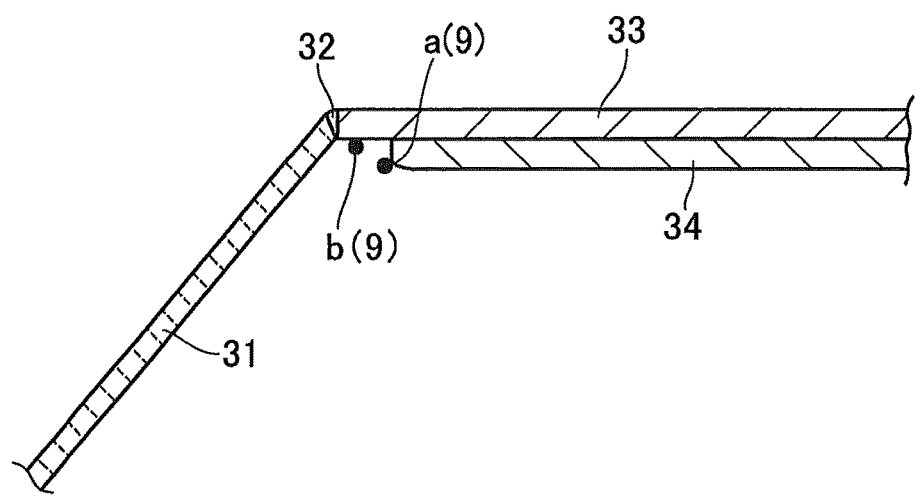
FIG. 7 is a cross-sectional view showing the discharging sheets attached to a roof panel or to an interior material.

According to the fourth example of the vehicle, the discharging sheets may also be attached to a corner of the pane to eliminate the static electricity from an inwardly bent portion of the pane from which the airflow tends to deviate during propulsion of the vehicle. Turning to FIG. 7, there is shown a cross-section of the pane of a windshield 31 in which the discharging sheets 9 are attached to upper corners of the pane. As shown in FIG. 7, an upper edge of the windshield 31 is connected to a roof panel 33 as a ceiling of the vehicle through a lip 32 made of resin, and an interior material 34 as a felting is attached to an inner surface of the roof panel 33. In order to discharge the static electricity from a front edge of the roof panel 33, according to the fourth example, the discharging sheets 9 are attached to a front edge of the interior material 34 (at point "a" in FIG. 7), and to an inner face of a front end of the roof panel 33 (at point "b" in FIG. 7). As in the foregoing examples, surfaces of the discharging sheets 9 are exposed to the external air. According to the fourth example, it is preferable to arrange the discharging sheets 9 in a symmetrical manner with respect to a width center of the vehicle. In addition, the discharging sheets may also be attached to a pane of a rear window to eliminate the static electricity therefrom.

According to the fourth example, therefore, the positive charges on the front edge of the roof panel 33 and the windshield 31 can be reduced by discharging the static electricity accumulating thereon to the vehicle interior through the discharging sheets 9. Consequently, separation of the airflow from the surface of the body 3 at a portion where the pane 7 is bent inwardly can be prevented to avoid deterioration in aerodynamic characteristics in the pitching direction. For these reasons, downforce of the vehicle can be ensured during propulsion to improve a turning performance, a traveling stability and an accelerating performance.

Thus, according to any of the foregoing examples, the static electricity accumulated on the window pane can be eliminated by the discharging sheets attached thereto to prevent separation of the airflow from the surface of vehicle body. As described, since the window pane is situated at relatively high level in any of the foregoing vehicles to ensure a passenger's view, deterioration in aerodynamic characteristics can be prevented especially effectively in the rolling direction and the pitching direction to improve a turning performance, a traveling stability and an accelerating performance of the vehicle. In addition, since discharging sheets 9 may be attached to blind spots from outside of the vehicle such as the inner face of the door and the interior material, the discharging sheets 9 will not disfigure the vehicle.

What is claimed is:

1. A vehicle, in which positive static charges accumulate on a vehicle body insulated from a road surface during propulsion of the vehicle, comprising:
   a self-discharge device that decreases a positive potential of a window pane of the vehicle body at which a positively charged airflow flowing along a vehicle surface of the vehicle body starts to deviate therefrom to flow away from the vehicle surface of the vehicle body, during the propulsion of the vehicle, by self-discharging to produce negative ions according to the positive potential of the window pane; and
   a door frame including the window pane, wherein
   the window pane is arranged in an upper area of a side of the vehicle body in a height direction of the vehicle; and
   the self-discharge device is a sheet made of a material having high electric conductivity and attached to an inner face of the window pane, and the sheet includes a knurled edge or a knurled surface wherein a corona discharge is caused
   wherein a door is fitted into the door frame of the vehicle body, the window pane is arranged in the door, a weather strip is attached to an inner face of the door, and the self-discharge device is attached to outside of the weather strip on the inner face of the door.

* * * * *